United States Patent [19]

Hedrick

[11] Patent Number: 4,595,567
[45] Date of Patent: Jun. 17, 1986

[54] COOLING FLUIDIZED CATALYTIC CRACKING REGENERATION ZONES WITH HEAT PIPE APPARATUS

[75] Inventor: Brian W. Hedrick, Rolling Meadows, Ill.

[73] Assignee: UOP Inc., Des Plaines, Ill.

[21] Appl. No.: 687,359

[22] Filed: Dec. 28, 1984

[51] Int. Cl.$^4$ .............................................. F23C 11/02
[52] U.S. Cl. ..................... 422/146; 122/40; 165/104.16; 165/104.18
[58] Field of Search ............... 422/139, 144, 146, 143, 422/145; 165/104.16, 104.18, 96, 39; 122/40

[56] References Cited

U.S. PATENT DOCUMENTS

| | | | |
|---|---|---|---|
| 2,350,348 | 6/1944 | Gaugler | 62/125 |
| 2,926,143 | 2/1960 | Leland | 252/417 |
| 3,971,634 | 7/1976 | Ranken et al. | 48/120 |
| 4,430,302 | 2/1984 | Krause | 422/144 |
| 4,434,245 | 2/1984 | Lomas et al. | 502/2 |
| 4,438,071 | 3/1984 | Vickers et al. | 422/109 |
| 4,483,276 | 11/1984 | Lomas et al. | 422/146 |

FOREIGN PATENT DOCUMENTS 1599398 9/1981 United Kingdom.
2126119A 3/1984 United Kingdom.

OTHER PUBLICATIONS

C. W. Strother et al., "FCC Getting Boost from All-Riser Cracking", The Oil and Gas Journal—May 15, 1972, pp. 102–110.

James J. Blazek, "Gains from FCC Revival Evident Now," The Oil and Gas Journal—Oct. 8, 1973, pp. 65–70.

K. Thomas Feldman, Jr. et al., "The Heat Pipe", Mechanical Engineering, pp. 30–33.

G. Yale Eastman, "The Heat Pipe", Scientific American, vol. 218, #5, May 1968, pp. 38–46.

Primary Examiner—Frank Sever
Attorney, Agent, or Firm—Thomas K. McBride; John F. Spears, Jr.

[57] ABSTRACT

An apparatus is presented for burning carbonaceous deposits off of fluidized particles. The apparatus is preferably employed as the catalyst regeneration zone of a fluidized catalytic cracking process. Heat pipes are used to cool the particles and transfer heat to an external steam generation zone. Preferably, the heat pipes extend vertically upward from an external catalyst transfer conduit to the steam generation chamber. The water level in the steam generation chamber or the density of the fluidized particles in contact with the heat pipes can be used to control the rate of heat removal from the combustion zone.

25 Claims, 3 Drawing Figures

COOLING FLUIDIZED CATALYTIC CRACKING REGENERATION ZONES WITH HEAT PIPE APPARATUS

FIELD OF THE INVENTION

The invention relates to a hydrocarbon conversion apparatus employed in the petroleum refining process referred to in the art as a fluidized catalytic cracking (FCC) process. The invention is specifically related to the apparatus employed for removing heat from a fluidized bed of cracking catalyst maintained within the regeneration zone of an FCC process. The subject apparatus employs heat pipes to transfer heat from the fluidized catalyst bed to a steam generation chamber, and the subject invention therefore also relates to the use of heat pipes in hydrocarbon conversion processing equipment.

BACKGROUND INFORMATION

Fluidized catalytic cracking processes were developed during the 1940's to increase the amount of naphtha boiling range hydrocarbons which could be obtained from crude oil. Fluidized catalytic cracking processes are now in widespread commercial use in petroleum refineries to produce lighter boiling point hydrocarbons from heavier feedstocks such as atmospheric reduced crudes or vacuum gas oils. Those knowledgeable in the art are therefore believed capable of adequately designing and operating FCC processes. Evidence of this is provided by several competing commercial designs shown in the articles at page 102 of the May 15, 1972 edition and at page 65 of the Oct. 8, 1973 edition of the "Oil and Gas Journal".

In a fluidized catalytic cracking process, "spent" catalyst is removed from a reaction zone and transferred into a regeneration zone. Carbonaceous deposits on the catalyst are burned within the regeneration zone. This generates a significant amount of heat. Those skilled in the art are cognizant of the fact that depending on the operational mode of the regeneration zone and the charge stock being processed in the FCC unit it is necessary or desirable to remove heat from the regeneration zone. This is described in U.S. Pat. No. 2,926,143 to M. B. Leland and U.S. Pat. No. 4,430,302 to B. J. Krause. These two references describe heat exchange coils placed within the large catalyst regeneration vessel. U.S. Pat. No. 4,434,245 issued to D. A. Lomas et al and U.S. Pat. No. 4,438,071 issued to A. G. Vickers are pertinent for their showing of the use of heat exchangers mounted externally to the overall catalyst regeneration vessel. These references describe a flow-through type catalyst cooler and a backmix type external catalyst cooler.

Heat pipes are a mechanical apparatus known to those in the heat transfer arts. It is believed heat pipes were first described in U.S. Pat. No. 2,350,348 to R. S. Gaueler. Heat pipes are very efficient at transferring heat between two different locations. Heat pipes basically comprise an outer cylindrical conduit which is sealed to retain a small amount of working fluid which may be vaporized and condensed at the temperatures of the heat source and heat sink respectively. A porous wick is located within the heat pipe to transfer liquid from the cool end to the warm end of the heat pipe. Heat pipes are described in greater detail in the article beginning at page 30 of the February 1967 edition of "Mechanical Engineering" and in an article beginning at page 38 of the May 1968 edition of "Scientific American", Volume 128, No. 5.

The use of a heat pipe to remove heat from a reaction zone is described in U.S. Pat. No. 3,971,634 issued to W. A. Renken et al. This reference is also pertinent in that the heat removed from the reaction section, which is a methanation zone, is transferred to a heat exchange section suitable for transferring heat to a cooling fluid. British Pat. No. 1,599,398 issued to K. F. Shaw is pertinent for its suggestion that heat pipes can be employed in a fluidized catalytic cracking process. The teaching in this reference is believed to be limited to the transfer of heat from the regeneration zone to the reaction zone in an FCC unit. British patent application No. 2,126,119 issued to R. A. McAllister is pertinent for its teaching that heat pipes may be used to remove heat from a fluidized bed reactor and transfer this heat to a heat sink wherein the heat is removed as by radiation, forced air, convection, water cooling, or the like. These references do not appear to touch upon the heat removal control system described herein.

SUMMARY OF THE INVENTION

The invention is an apparatus suitable for use as an FCC regeneration zone wherein heat is removed from the fluidized bed of catalyst present in the regeneration zone through the use of heat pipes which conduct the heat to a steam generation chamber. The subject apparatus has a number of advantages over the prior art method of employing heat exchange conduits in which water is vaporized in heat exchange conduits which are in contact with the fluidized catalyst bed. For instance, rupture of the heat pipe does not result in the injection of a large amount of water into the regeneration zone as would occur with the rupture of a water-filled heat exchange conduit. Another advantage of the subject apparatus is that the rate of heat removal through the heat pipes may be controlled by regulating the amount of boiler feed water or other cooling fluid in contact with the cool end of the heat pipes. This allows a much greater level of control over the heat removal provided by the apparatus as compared to prior art heat exchange conduits which normally must remain filled with water and steam even when it is not desired to perform any cooling. These and other advantages are described below.

The invention may be broadly characterized as an apparatus for the combustion of carbonaceous materials present on fluidizable particles employed in a hydrocarbon conversion process which comprises means for confining a fluidized mass of said particles comprising a chamber, a particle inlet, a particle outlet, an oxygen-containing gas inlet and a flue gas outlet, with the flue gas outlet communicating with an upper end of the chamber; a steam generation chamber having associated therewith a means to charge liquid water to the steam generation chamber and to remove steam from the steam generation chamber; and a plurality of heat pipes, each heat pipe having a first end located within said means for confining the fluidized mass of particles and a second end located within said steam generation chamber.

DETAILED DESCRIPTION

The subject apparatus is useful in removing heat from a reaction zone containing a fluidized bed of solid particles. It is preferred that the particles are catalyst although they can be an admixture of catalyst and other types of particles or may be totally devoid of catalyst. The particles can be catalyst used for desulfurization, denitrification or other hydrotreating processes used to upgrade petroleum fractions. Noncatalytic particles may be present due to their ability to remove pollutants such as sulfur oxides through physical or chemical adsorption or by actual chemical reaction. The subject invention will be basically described in terms of use in a fluidized catalytic cracking unit as this is the preferred and best known usage of the invention.

Fluidized catalytic cracking processes are in widespread commercial use in petroleum refineries. They are utilized to reduce the average molecular weight of various petroleum-derived feed streams and thereby produce lighter higher value products. The FCC process involves contacting the charge stock in a reaction zone with a finely divided solid catalytic material which behaves as a fluid when mixed by a gas. During use in the reaction zone, the surface of a catalyst becomes covered with hydrocarbonaceous material referred to as coke. Coke is a by-product of the cracking reaction and is comprised of hydrogen, carbon, and other materials such as sulfur. The presence of coke on the catalyst surface degrades the activity of the FCC catalyst. The coke is therefore removed from the catalyst surface by combustion in a so-called regeneration facility or regeneration zone. In the regeneration zone, the coke contaminated spent catalyst is admixed with an oxygen-containing gas at conditions which result in the coke being oxidized. This produces flue gases and releases a considerable amount of heat.

Processing heavier, higher molecular weight hydrocarbons as feed material normally results in an increased amount of coke being deposited upon the surface of the catalyst. The combustion of this increased amount of coke can result in an excessive temperature being generated in the regeneration zone. These excessively high temperatures are detrimental in that they may damage the catalyst, exceed the metallurgical limits of the regeneration apparatus leading to damage to the apparatus and possible unsafe operation, and also have detrimental impact on the operation of the reaction zone operation. For this reason, various techniques have been developed for removing a portion of this heat through indirect heat exchange. Typically, this heat exchange comprises passing boiler feed water through heat exchange tubes which are in contact with the fluidized bed of catalyst within the combustion zone or in contact with catalyst being circulated through some point in the overall regeneration zone.

This heat removal method has proved highly successful. However, there still remains some operational problems and disadvantages to the use of heat exchange coils containing boiler feed water which are brought into contact with the hot catalyst. For instance, as previously described it is normally desired to maintain a positive flow of water through the cooling coil at all times. This is basically to prevent the cooling coil from reaching an excessive temperature above the metallurgical limits of the coil. This means that the cooling coil would be removing heat from the regeneration zone even at times when it is not desired for this heat to be removed. That is, the heat exchangers would be removing heat during start-up or shut down of the regeneration zone or during times when either the charge rate or the composition of the fuel is such that heat removal is not required. Another operational problem of heat exchange coils which are in direct contact with the catalyst bed is that the rupturing of any of the coils will result in the uncontrolled flow of water into the regeneration zone unless a separate valving means to prevent this flow is provided for each heat exchange coil. The cost of providing a separate valving means on each heat exchange coil and the resultant complication of the cooling water flow schemes result in separate emergency shutoff valves being commercially impractical. Finally, it may be difficult to control the rate at which heat is removed from the regeneration zone by water cooled heat exchangers. This is especially true in the situation of older FCC units which do not have facilities for controlling the amount of fluidization and therefore the heat exchange rate at the surface of the heat exchange pipes.

It is therefore an objective of the subject invention to provide a method for removing heat from the regeneration zone of a fluidized catalytic cracking process which does not require the contact of water cooled heat exchanger conduits with the fluidized catalyst. It is a further objective of the subject invention to provide a method and apparatus for retrofitting catalyst cooling means onto FCC regeneration zones. It is a further objective of the subject invention to provide an apparatus and method for cooling the hot catalyst present in an FCC regeneration zone which does not result in significant adverse impact upon the operation of the regeneration zone when one or more of the heat exchange elements ruptures and releases heat exchange fluid into the regeneration zone.

The feed stream through an FCC process will be described herein in terms of petroleum-derived materials but is not limited to these materials. Liquids derived from tar sands, oil shale, or the liquefaction of coal may be charged to an FCC process. The typical feed to an FCC unit is a gas oil such as a light or vacuum gas oil. Other petroleum derived feed streams may comprise a diesel boiling range mixture of hydrocarbons or heavier hydrocarbons such as reduced crude oils. It is preferred that the feed stream comprises a mixture of hydrocarbons having boiling points, as determined by the appropriate ASTM test method, above about 350° F. and more preferably above 450° F. It is becoming customary to refer to FCC type units which are processing heavier feedstock such as atmospheric reduced crudes as RCC (residual crude cracking) units or resid cracking units.

An FCC process unit comprises a reaction zone and a catalyst regeneration zone. In the reaction zone, the feed stream is contacted with a finely divided fluidized catalyst maintained at elevated temperatures and at a moderate positive pressure. This contacting could take place in a relatively large fluidized or ebulated bed of catalyst, although this approach is not preferred. The reaction zones employed in FCC units have generally evolved to the use of a normally vertical conduit as the main reaction site with the effluent of a conduit emptying into a large volume process vessel. The riser reaction system and operating method described in U.S. Pat. No. 4,479,870 is preferred. One or more solids-vapor separation devices, almost invariably a cyclone, is normally located at the top of this vessel. The gaseous products of the reaction are separated from fluidized catalyst within the cyclone and vented from the reaction zone. The "spent" catalyst falls downward through a dipleg or other means to a lower location within the reaction zone. It is then drawn off and transferred to a separate regeneration zone.

The rate of conversion of the feed stock within the reaction zone is controlled by regulation of the temperature, activity of the catalyst and quantity of the catalyst (i.e., catalyst to oil ratio) maintained within the reaction zone. The most common method of regulating the temperature in the reaction zone is by regulating the rate of circulation of catalyst from the regeneration zone to the reaction zone, which simultaneously increases the catalyst/oil ratio. That is, if it is desired to increase the conversion rate within the reaction zone, the rate of flow of catalyst from the regeneration zone to the reaction zone is increased. This results in more and fresher catalyst being present in the reaction zone for the same volume of oil charged thereto. Since the temperature within the regeneration zone under normal operations is considerably higher than the temperature within the reaction zone, an increase in the rate of circulation of catalyst from the regeneration zone to the reaction zone results in an increase in the reaction zone temperature.

The chemical composition and structure of the feed to the FCC unit will affect the amount of coke deposited upon the catalyst in the reaction zone. Normally, the higher the molecular weight, Conradson carbon, heptane insolubles and carbon to hydrogen ratio of the feedstock, the higher will be the coke level on the spent catalyst. Also, high levels of combined nitrogen, such as found in shale-derived oils will increase the coke level on spent catalyst. The processing of heavier feedstocks, such as the processing of deasphalted oils or the direct processing of atmospheric bottoms from a crude oil fractionation unit commonly referred to as reduced crude increases some or all of these factors and therefore causes an increase in the coke level on spent catalyst. As used herein, the term "spent catalyst" is intended to indicate catalyst employed in the reaction zone which is being transferred to the regeneration zone for the removal of coke deposits. The term is not intended to be indicative of a total lack of catalytic activity by the catalyst particles.

The reaction zone, which due to the widespread use of a vertical conduit is referred to as a "riser", is maintained at high temperature conditions which generally include a temperature above about 800° F. (427° C.). Preferably the reaction zone is maintained at cracking conditions which include a temperature of about 900° F. (482° C.) to 1350° F. (734° C.) and a pressure of about 10 to about 200 psig but preferably less than 100 psig. The catalyst/oil ratio, based on the weight of catalyst and feed hydrocarbons entering the bottom of the reaction conduit or riser, may range up to 100:1 with some naphtha boiling range materials, but is preferably between about 4:1 and about 25:1 on the basis of total hydrocarbon feed to the reactor. Hydrogen is not normally added to the riser although the use of hydrogen addition is known in the art. Steam may also be passed into the riser on occasion. The average residence time of the catalyst in the riser is preferably less than about 10 seconds. The type of catalyst employed in the process may be chosen from a variety of commercially available catalysts. A catalyst comprising a zeolitic base material is preferred but the older style amorphous catalyst can be used if desired.

In an FCC process, catalyst is continuously circulated from the reaction zone to the regeneration zone and then again to the reaction zone. The catalyst therefore acts as a vehicle for the transfer of heat from zone to zone as well as providing the necessary catalytic activity. Catalyst which is being withdrawn from the regeneration zone is referred to as "regenerated" catalyst. As previously described, the catalyst charged to the regeneration zone is brought into contact with an oxygen-containing gas such as air, oxygen-enriched air or pure oxygen under conditions which result in the combustion of the coke. This results in an increase in the temperature of the catalyst and the generation of a large amount of hot gas removed from the regeneration zone as a gas stream referred to as a flue gas stream. When the regeneration zone is operated at a signficant positive or superatmospheric pressure, the flue gas stream may be passed through a power recovery turbine to generate useful mechanical energy which can be consumed as in the compression of air charged to the regeneration zone for the production of electricity. It is generally desired to operate the regeneration zone at a temperature of from about 1100° F. (593° C.) to about 1450° F. (788° C.)

The catalyst regeneration zone is preferably operated at a pressure of from about 5 to about 100 psig. The spent catalyst being charged to the regeneration zone may contain from about 0.2 to about 5 wt. % carbon as coke. This coke is predominantly comprised of carbon and can contain from about 5 to 15 wt. % hydrogen, as well as sulfur and other elements. The oxidation of coke will therefore produce the common combustion products: carbon dioxide, carbon monoxide, and water. As known to those skilled in the art, the regeneration zone may take several configurations, with the regeneration being performed in one or more stages. Further variety is possible due to the fact that the regeneration may be performed with the fluidized catalyst being present as either a dilute phase or a dense phase within the regeneration zone, or the catalyst may be present as a dilute phase in one part of the regeneration zone and as a dense phase within another part of the regeneration zone. As used herein, the term "dilute phase" is intended to indicate a catalyst/gas mixture having a density of less than 30 pounds per cubic foot. In a similar manner, the term "dense phase" is intended to mean the catalyst/gas mixture has a density equal to or more than 30 pounds per cubic foot. Representative dilute phase operating conditions often include a catalyst/gas mixture having a density of about 2 to about 10 pounds per cubic foot.

Figure 1:
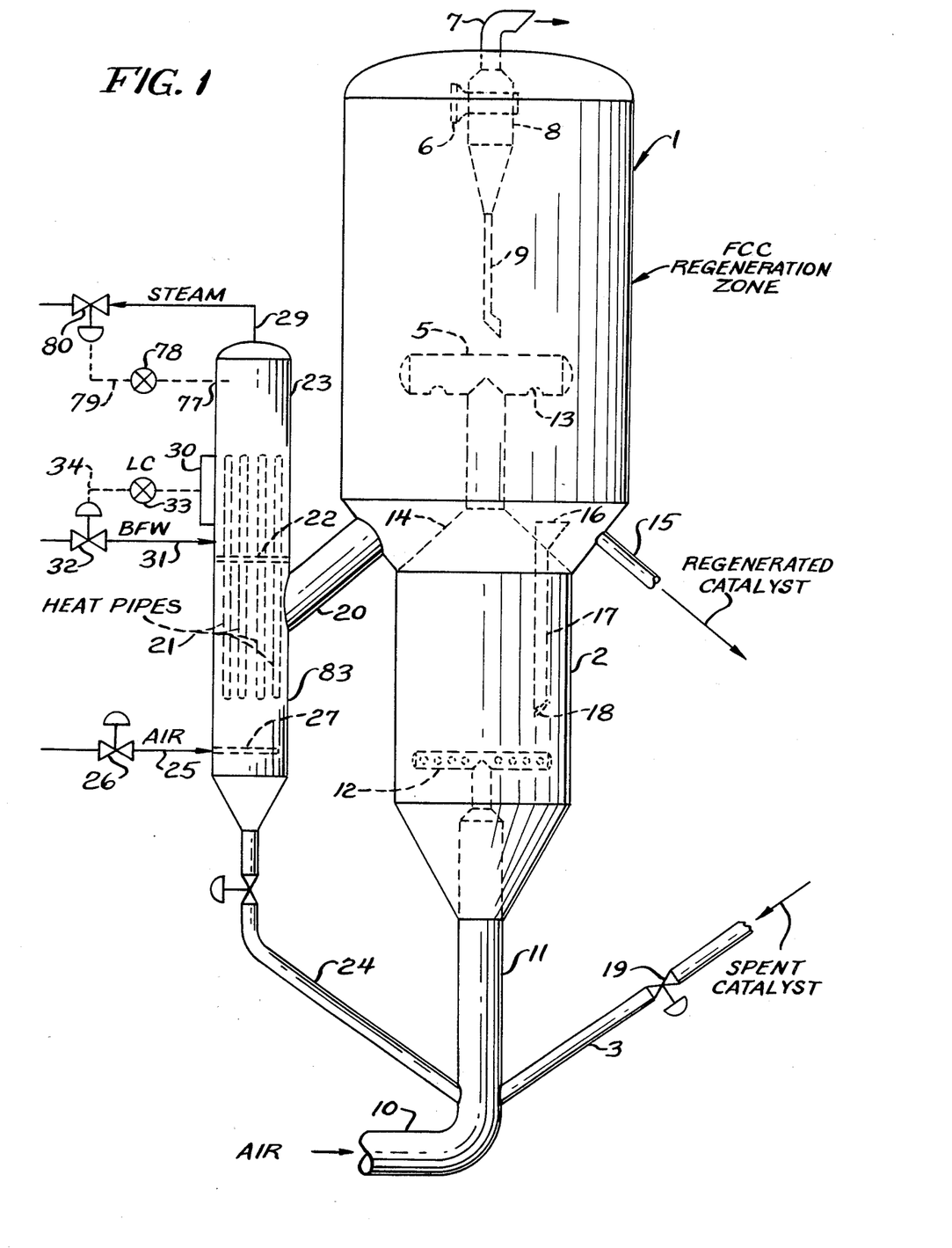
FIG. 1 is a diagrammatic sketch showing an FCC catalyst regeneration zone 1, with heat pipes 21 removing heat from catalyst flowing through conduits 20 and 24 and transferring this heat to water in the steam generation chamber 23.

The subject invention may be adapted to use in FCC regeneration zones having several configurations. The subject apparatus and the method in which this apparatus is used is therefore subject to variation and is not to be limited to one specific embodiment. Referring now specifically to FIG. 1, there is shown a single stage FCC regeneration zone 1 which includes the catalyst cooling zone located in an external catalyst transfer line. Spent catalyst is transferred into the vertically aligned outer vessel of the main portion of the regeneration zone through line 3 at a rate controlled by the side valve 19. Air is charged to the regeneration zone through conduit 10, with the rising air fluidizing and lifting catalyst particles from conduits 3 and 24. The particles ascend through the regeneration riser 11 and are discharged from openings in the air/particle distributor grid 12. Particles are then contained for a short period of time within the lower regeneration or combustion chamber 2 before being discharged upward through a vertical venting conduit into the horizontal shroud 5. Fluidized catalyst is caused to travel in this upward direction by the regeneration gases and the residual components of the air charged to the bottom of the regeneration zone. This rising gas stream carries catalyst upward through the vertical conduit and through the openings 13 in the bottom of the shroud to thereby deliver at least partially regenerated catalyst to the upper chamber of the FCC regeneration zone.

Hot regenerated catalyst is collected in the bottom of the upper chamber as a dense bed supported by the outer wall of the vessel and the imperforate top wall 14 of the lower chamber. The regenerated catalyst is drawn off in a controlled manner through line 15 for passage into the reaction zone. The accumulation of an excessive level of catalyst in the dense bed located in the bottom of the disengagement chamber may be avoided through the use of an optional dipleg 17 which communicates between the upper disengaging chamber and the lower combustion chamber. When the dense phase bed reaches a predetermined level, it will overflow the lip 16 at the top of a hopper located at the upper end of the dipleg. The catalyst will then flow into and downward through the dipleg 17 and emerge in the lower combustion chamber. A valve means to restrict catalyst flow, which is preferably a counterweighted flapper valve 18, is employed to limit the catalyst flow downward through the dipleg to those instances in which an excess amount of catalyst is present in the disengaging chamber and also to prevent the undesired upward passage of gases through the dipleg.

Due to the large cross-sectional area of the disengaging chamber, the combustion gases and residual components of the air stream are largely separated from the catalyst particles, which tend to fall to the bottom of the disengaging chamber. Nevertheless, some catalyst particles are carried upward into an upper portion of the disengaging chamber. A gas stream containing this fluidized catalyst enters the cyclone separator 8 through the inlet throat 6 and is therein separated into the flue gas stream discharged from the regeneration zone through line 7 and the collected catalyst particles which are discharged downward through dipleg 9 into a lower portion of the disengaging zone.

As previously described, it may be necessary to continuously or periodically remove heat from the regeneration zone. In the apparatus shown in FIG. 1, heat is removed by passing relatively hot catalyst downward through a particle circulation conduit comprising the catalyst take-off conduit 20, the cooling chamber 83, and return conduit 24. The hot catalyst particles are withdrawn from the dense bed of catalyst maintained in the upper disengagement chamber and passed downward into contact with the heat pipes 21. The flow rate of the descending catalyst is preferably controlled by a valve means located in conduit 24 below the heat pipes. The heat transfer rate between the descending hot catalyst and the heat pipes may be regulated at least in part through use of a fluidizing gas charged to a lower portion of the cooling chamber 83. Preferably this fluidizing gas is air supplied through line 25 at a rate controlled by valve 26 and distributed across the cross-sectional area of the cooling chamber through the distributor grid 27. The air charged to the cooling chamber fluidizes the catalyst contained within the cooling chamber, with the heat transfer coefficient between the heat pipes and the catalyst being dependent upon the state of fluidization of the catalyst retained within this chamber. The fluidizing gas then passes upward into the disengaging zone. When air is employed as the fluidizing gas, this air may be employed to perform additional combustion within the disengaging zone, although additional combustion is not normally performed to any appreciable extent in the disengaging zone. FIG. 1 illustrates the use of a vertically aligned cylindrical vessel to form the cooling chamber 83. It is also within the scope of the inventive concept that the cooling chamber and/or heat pipes in contact with the catalyst may be inclined from vertical or actually be horizontally aligned.

The heat pipes extend upward from the cooling chamber through a tube sheet 22 into a steam generation chamber 23. The working fluid contained within the heat pipes, which is evaporated in the lower portion of the heat pipes, rises to the upper portion of the heat pipes located within the steam generation chamber 23. It is therein condensed, with the latent heat of vaporization of this working fluid being transferred through the walls of the heat pipe to water present within the steam generation chamber. This water is charged through line 31 at a rate controlled by valve 32. The level of the boiler feed water (bfw) in the steam generation chamber is monitored by the level control means 30 which transmits a signal to the level controller 33 which in turn transmits a control signal to the valve 32 through means 34. The heat being transferred upward into the steam generation chamber by the heat pipes causes the vaporization of the water, with the overall rate of heat transfer and therefore the rate of cooling being governed at least in part by the level of liquid-phase water within the steam generation chamber. The water level determines the relative amount of the total area of the upper portion of the heat pipe which is available for steam generation. Decreasing the area of heat pipe surface in contact with liquid water decreases the rate of steam generation. The level control means may therefore be employed as part of an overall heat removal control system. The steam which is produced is vented from the top of the vertical steam generation chamber through line 29. The rate of steam removal may be governed through the use of a pressure sensor 77 communicating with the interior of the steam generation chamber which transmits a signal to the pressure controller 78. The pressure controller in turn transmits a flow control signal to the valve means 80 through means 79 to thereby regulate the pressure within the steam generation chamber. The overall rate of heat removal, that is the total amount of heat removed, by the subject invention will normally be controlled based upon a temperature monitored at some point within the FCC process. This temperature measurement could be, for example, at the riser outlet, the withdrawal point of regenerated catalyst from the regeneration zone or at a normally high temperature point within the regeneration zone.

Figure 2:
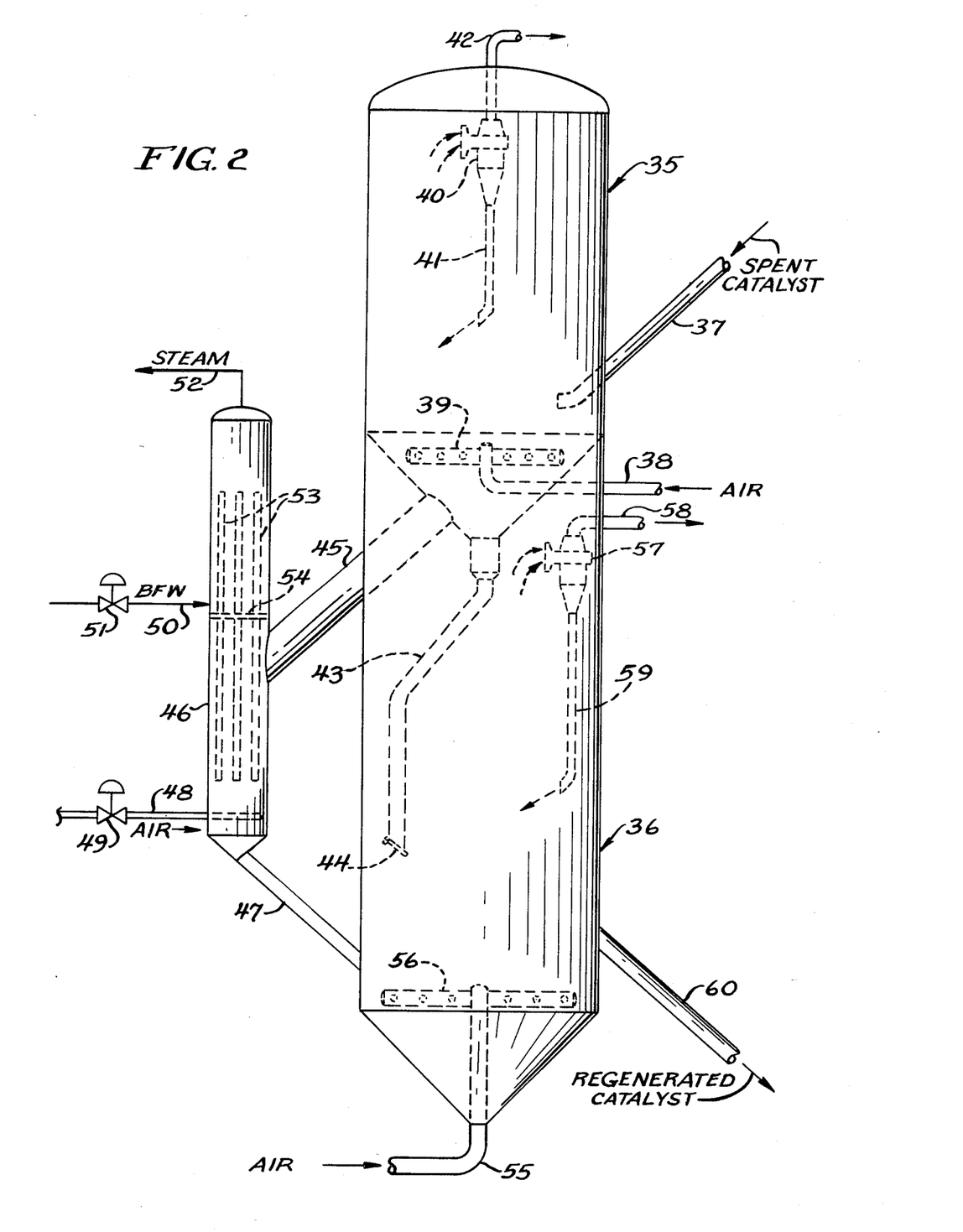
FIG. 2 is also a diagrammatic sketch of an FCC regeneration zone, but is distinguished from the apparatus of FIG. 1 in that two separate stages of catalyst regeneration are employed with each stage having its own means to supply air and remove flue gas.

FIG. 2 illustrates a so-called two-stage FCC regeneration zone. That is, the catalyst is subjected to two separate regeneration steps in separate chambers each having its own air supply and flue gas withdrawal means. The FCC catalyst therefore passes in series flow through the two different regeneration stages. Referring now to the drawing, the spent catalyst enters the cylindrical upper combustion or regeneration chamber 35 through line 37. Air, or another oxygen-containing gas, is charged through line 38 to an air distribution grid 39 located in the bottom of the upper regeneration chamber. The upward rising gases fluidize the catalyst located in the bottom part of the regeneration chamber, which is present as a relatively dense bed. The oxygen reacts with carbon upon the catalyst to form partially regenerated catalyst and flue gases which rise to the upper portion of the regeneration vessel. These gases and the entrained catalyst particles enter the cyclone separation means 40 and are therein separated into the flue gas stream removed from the regeneration zone through line 42 and the collected catalyst which is returned to the lower portion of the upper regeneration stage through dipleg 41.

The partially regenerated catalyst produced in the upper regeneration chamber may flow downward to the lower second regeneration chamber through two different routes. First, the catalyst may flow downward through conduit 43 when it reaches a height sufficient to overcome the flow resistance imposed by the counterweighted valve means 44. The entrance point of the partially regenerated catalyst into the conduit 43 can be raised by a means not shown resembling the upper part of the dipleg 17 of FIG. 1 to maintain a predetermined catalyst level within the upper regeneration chamber. The second flow path for the catalyst from the first regeneration chamber to the second regeneration chamber is through the particle circulation conduit formed by the takeoff conduit 45, the cooling chamber 46, and the catalyst return conduit 47. Catalyst flowing via this route is brought into contact with heat pipes 53 which may be employed as desired to remove heat from the catalyst flowing in this manner. The catalyst flowing downward by either route enters the lower regeneration chamber enclosed within the cylindrical vessel 36, which may be a different diameter than the upper vessel 35. Air used in the regeneration performed in the lower regeneration stage is charged through line 55 and distributed about the cross section of the lower regeneration zone through the regeneration grid 56. The fully regenerated catalyst is removed from the lower chamber through line 60. Flue gas and entrained particles enter the cyclone separation means 57 and are therein separated into a second flue gas stream withdrawn through line 58 and a stream of recovered catalyst particles which are returned to a lower portion of the regeneration zone through dipleg 59.

The rate of catalyst flow through the catalyst circulation conduit may be controlled by valve means not shown or a fixed orifice means also not shown located in either conduit 45 or conduit 47. A fluidizing gas, which is preferably air, is preferably passed into a lower portion of the cooling chamber 46 through conduit 48 at a rate controlled by valve 49. The rate of flow of the fluidizing gas charged to the cooling chamber will to a certain extent affect the flow rate of catalyst downward through the particle circulation conduit. The heat pipes extend vertically through the tube sheet 54 which provides a fluid-tight seal between the lower cooling chamber and the superjacent steam generation chamber. Boiler feed water is supplied to the upper chamber through line 50 at a rate controlled by valve 51. This produces steam which is withdrawn through line 52. The level control means and pressure control means shown in FIG. 1 can also be employed in this embodiment to regulate the pressure of the steam produced and the amount of heat withdrawn by the apparatus.

Figure 3:
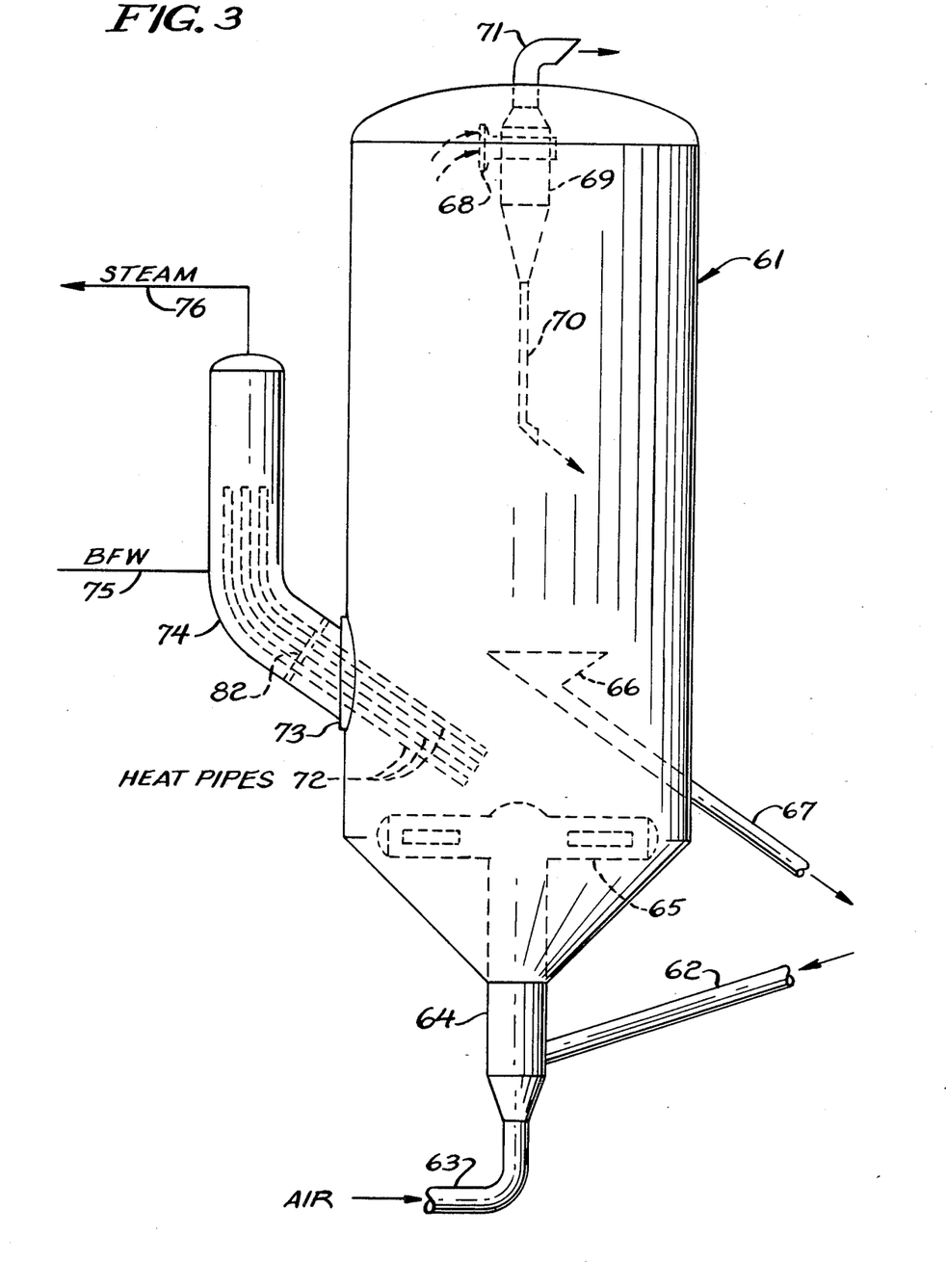
FIG. 3 is a diagrammatic sketch illustrating how the subject apparatus may be employed as a retrofit or revamp of an older-style FCC regeneration unit having a single regeneration chamber 61.

FIG. 3 illustrates a simpler FCC catalyst regeneration zone intended to be representative of how the subject invention can be retrofitted into older FCC regeneration zones. Referring now to the drawing, the regeneration zone comprises a single cylindrical vessel 61. Spent catalyst from inlet conduit 62 is admixed with air charged through inlet conduit 63 and passed upward through the regeneration riser 64 to a catalyst/air distribution grid 65. The catalyst is retained for a short time within the regeneration zone, preferably as a dense bed located in the bottom of the regeneration vessel. Regenerated catalyst is collected in the hopper 66 and withdrawn through outlet conduit 67 for passage into the reaction zone. The flue gases and entrained catalyst present in the upper portion of the regeneration vessel enter the cyclone separator 69 through throat 68 and are therein separated into the flue gas stream discharged from the regeneration zone through gas outlet conduit 71 and a stream of catalyst returned through line 70. These elements are those customarily present within this style of regeneration zone prior to the addition of the heat removal means employed in the subject invention. To retrofit this regeneration zone to perform the subject invention, the heat removal means is mounted onto the side of the regeneration zone by means of a flange 73 which is bolted or welded, etc. to an opening cut in the side of the vessel wall. The bundle of heat pipes 72 extends downward at an angle into the dense bed of catalyst present in the regeneration zone. The vapors formed within the heat pipes carry heat upward through the heat pipes to the section of the heat pipes located within the steam regeneration chamber enclosed by the smaller vessel 74. The steam generation chamber is again separated from the portion of the apparatus containing the catalyst by a tube sheet 82. Boiler feed water charged through line 75 is converted to steam within the steam generation chamber, with the steam being withdrawn through line 76.

One embodiment of the invention may be therefore characterized as an apparatus for the regeneration of catalyst used in a fluidized catalytic cracking process which comrpises: an upper chamber, with means being provided to withdraw a flue gas stream from an upper portion of the upper chamber and to withdraw regenerated particles from a lower portion of the upper chamber; a lower chamber, with means being provided to pass used catalyst and an oxygen-containing gas stream into the lower chamber; means to transfer fluidized catalyst upward from the lower chamber into the upper chamber; a particle circulation conduit located externally to the upper and lower chambers, with the particle circulation conduit extending downward from a lower portion of the upper chamber to the lower chamber; a steam generation chamber located outside of the upper and lower chambers; and a plurality of heat exchange pipes having a first end located in said particle circulation conduit and a second end located in said steam generation chamber.

The heat pipes employed in the subject process should be fabricated out of metals which will withstand the erosion and the temperatures encountered in an FCC regeneration zone. The use of stainless steels and similar metals is therefore preferred. The working fluid within the heat pipes will be those customarily employed at relatively high temperatures such as sodium, potassium, cesium, or mercury. These substantially pure compounds can be admixed with a small amount of a modifier to adjust the heat transfer characteristics and operating temperature range of the desired working fluid. It is preferred that the heat pipes have an outer diameter in excess of one inch and less than five inches. The number of heat pipes is expected to range between fifty and about 350. The length of the heat pipes should normally be less than 30 feet overall. Standard references describe the selection and construction of heat pipes and may be consulted for further details in this regard.

It may therefore be observed that the present invention provides a highly workable system which has the several advantages previously pointed out. For instance, the subject apparatus does not require the continuous passage of cooling water through the heat removal elements. It may therefore be totally removed from use such that no heat is being withdrawn from the regeneration zone. It also has the advantage that each heat exchange tube is in effect sealed at each end such that a rupture of the tube could release the working fluid to either the catalyst-containing zone or the steam generation zone, but could not result in the direct passage of large quantities of cooling water into the catalyst regeneration zone as would occur with the rupture of a water-containing heat exchange pipe. Further advantages of the subject apparatus include the ability to generate relatively high pressure (1200 psig) steam, and the ability to provide a relatively easy method of controlling the rate of heat removal by the apparatus.

I claim as my invention:

1. An apparatus for the combustion of carbonaceous materials present on fluidizable particles employed in a hydrocarbon conversion process which comprises:
   (a) means for confining a fluidized mass of said particles comprising a chamber, a particle inlet, a particle outlet, an oxygen-containing gas inlet and a flue gas outlet, with the flue gas outlet communicating with an upper end of the chamber;
   (b) a steam generating chamber having associated therewith a means to charge liquid water to the steam generation chamber and remove steam from an upper end of the steam generation chamber at a point above a level at which water would rest in a lower portion of the chamber; and,
   (c) a plurality of heat pipes, each heat pipe having a lower first end located within said means for confining the fluidized mass of particles and an upper second end located within said steam generation chamber.

2. The apparatus of claim 1 further characterized in that said means for confining the fluidized mass of particles comprises both an upper chamber and a lower chamber and means to transfer particles upward from the lower chamber to the upper chamber by fluidization in a gas stream.

3. The apparatus of claim 2 further characterized in that the first end of said heat pipes is located within said upper chamber.

4. The apparatus of claim 2 further characterized in that said means for confining the fluidized mass of particles also comprises a particle circulation conduit located external to the upper and lower chambers and providing a vertical flow path between the upper and lower chambers.

5. The apparatus of claim 4 further characterized in that the first end of said heat pipes is located within said upper chamber.

6. The apparatus of claim 4 further characterized in that the first end of said heat pipes is located within the particle circulation conduit.

7. The apparatus of claim 6 further characterized in that the steam generation chamber is located above the portion of the particle circulation conduit which contains the first end of said heat pipes.

8. The apparatus of claim 2 further characterized in that the apparatus is a catalyst regeneration zone of a fluidized catalytic cracking process.

9. The apparatus of claim 1 further characterized in that the apparatus also comprises means to regulate heat transfer by the heat pipes comprising a means to control the level of liquid-phase water in contact with said heat pipes in the steam generation chamber.

10. An apparatus for the regeneration of catalyst used in a fluidized catalytic cracking process which comprises:
    (a) an upper chamber, with means being provided to withdraw a flue gas stream from an upper portion of the upper chamber and to withdraw regenerated particles from a lower portion of the upper chamber;
    (b) a lower chamber, with means being provided to pass used catalyst and an oxygen-containing gas stream into the lower chamber;
    (c) means to transfer fluidized catalyst upward from the lower chamber into the upper chamber;
    (d) a particle circulation conduit located externally to the upper and lower chambers, with the particle circulation circuit extending downward from a lower portion of the upper chamber to the lower chamber;
    (e) a steam generation chamber located outside of the upper and lower chambers; and
    (f) a plurality of heat pipes having a lower first end located in said particle circulation conduit and an upper second end located in said stream generation chamber, with a steam removal conduit being attached to the steam chamber at a point above the heat pipes.

11. The apparatus of claim 10 further characterized in that the steam generation chamber is located above substantially all of the particle circulation conduit.

12. The apparatus of claim 11 further characterized in that the heat pipes have a substantially vertical orientation.

13. The apparatus of claim 11 further characterized in that a particle flow control means is located within the particle circulation conduit.

14. The apparatus of claim 10 further comprising means to control the liquid phase water level within the steam generation chamber.

15. The apparatus of claim 14 further comprising a means to supply a fluidizing gas into a lower portion of the particle circulation conduit.

16. The apparatus of claim 10 further characterized in that the apparatus comprises a means to pass an oxygen-containing gas stream into the upper chamber.

17. The apparatus of claim 16 further characterized in that the apparatus comprises a means to separately withdraw a second flue gas stream from said lower chamber.

18. The apparatus of claim 10 further characterized in that the apparatus comprises a means to regulate the rate of heat transfer through said heat pipes from the particle circulation conduit to the steam generation chamber which comprises a means to control the level of liquid-phase water in contact with said heat pipes in the steam generation chamber.

19. An apparatus for the regeneration of catalyst used in a fluidized catalytic cracking process which comprises:
   (a) a means for confining a fluidized bed of catalyst comprising a vertically aligned first cylindrical chamber, a catalyst inlet conduit, a catalyst outlet conduit, an inlet conduit for an oxygen-containing gas stream and a flue gas outlet conduit;
   (b) a catalyst cooling chamber located outside said means for confining a fluidized bed of catalyst;
   (c) a catalyst transfer conduit extending between said first chamber and said catalyst cooling chamber;
   (d) a steam generation chamber;
   (e) a plurality of heat pipes, each heat pipe haivng a lower first end located within said catalyst cooling chamber and an upper second end located within the steam generation chamber and,
   (f) means to charge liquid water to the steam chamber and to collect and remove steam from the steam chamber at a point above the heat pipes.

20. The apparatus of claim 19 further characterized in that the catalyst cooling chamber is vertically aligned.

21. The apparatus of claim 20 further characterized in that the catalyst transfer conduit is attached to an upper end of the catalyst cooling chamber.

22. The apparatus of claim 21 further characterized in that the steam generation chamber is superjacent the catalyst cooling chamber.

23. The apparatus of claim 22 further characterized in that a catalyst removal conduit is attached to a lower end of the catalyst cooling chamber and communicates with the means for confining a fluidized bed of catalyst at a lower elevation than said catalyst transfer conduit communicates with the first chamber thereby providing a catalyst recirculation conduit.

24. The apparatus of claim 19 further comprising a means for passing a fluidizing gas into the catalyst cooling chamber at a point below at least a portion of the heat pipes located within the catalyst cooling chamber.

25. The apparatus of claim 19 further comprising a means to control the level of liquid phase water present in the steam generation zone and to thereby regulate the amount of heat removed through the heat pipes from the catalyst cooling chamber.

* * * * *